(12) United States Patent
Xie et al.

(10) Patent No.: US 10,326,756 B2
(45) Date of Patent: *Jun. 18, 2019

(54) MANAGEMENT OF CERTIFICATE AUTHORITY (CA) CERTIFICATES

(71) Applicant: Fortinet, Inc., Sunnyvale, CA (US)

(72) Inventors: Michael Xie, Palo Alto, CA (US); Jinhai Yang, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,382

(22) Filed: Feb. 5, 2018

(65) Prior Publication Data
US 2018/0159848 A1    Jun. 7, 2018

Related U.S. Application Data

(63) Continuation of application No. 15/257,505, filed on Sep. 6, 2016, now Pat. No. 9,887,985, which is a
(Continued)

(51) Int. Cl.
*H04L 29/00* (2006.01)
*H04L 29/06* (2006.01)
(Continued)

(52) U.S. Cl.
CPC ........ *H04L 63/0823* (2013.01); *H04L 9/3263* (2013.01); *H04L 63/02* (2013.01);
(Continued)

(58) Field of Classification Search
CPC .............. H04L 63/0823; H04L 63/062; H04L 63/0435; H04L 9/3263; H04L 67/34; H04L 63/20; H04L 63/164; H04L 63/02
See application file for complete search history.

(56) References Cited

U.S. PATENT DOCUMENTS

| 7,788,271 B2 | 8/2010 | Soma et al. |
| 8,522,031 B2 | 8/2013 | Miller |

(Continued)

OTHER PUBLICATIONS

Notice of Allowance for U.S. Appl. No. 14/571,555 dated Aug. 22, 2016.
(Continued)

*Primary Examiner* — Morshed Mehedi
(74) *Attorney, Agent, or Firm* — Jaffery Watson Mendonsa & Hamilton LLP

(57) ABSTRACT

Systems and methods for automatically installing CA certificates received from a network security appliance by a client security manager to make the CA certificate become a trusted CA certificate to a client machine are provided. In one embodiment, a client security manager establishes a connection with a network security appliance through a network, wherein the client security manager is configured for managing security of a client at the client side and the network security appliance is configured for managing the security of traffic pass through the network. The client security manager downloads from the network security appliance a certificate authority (CA) certificate to be used for signing a server certificate of a secure connection between the network security appliance and the client and automatically installs the CA certificate into a certificate store of the client.

18 Claims, 8 Drawing Sheets

Related U.S. Application Data continuation of application No. 14/571,555, filed on Dec. 16, 2014, now Pat. No. 9,455,980.

(51) Int. Cl.
  *H04L 9/32* (2006.01)
  *H04L 29/08* (2006.01)
(52) U.S. Cl.
  CPC ........ *H04L 63/0435* (2013.01); *H04L 63/062* (2013.01); *H04L 63/164* (2013.01); *H04L 63/20* (2013.01); *H04L 67/34* (2013.01)

(56) References Cited

U.S. PATENT DOCUMENTS

| | | |
|---|---|---|
| 9,230,125 B2 | 1/2016 | Inoue |
| 9,455,980 B2 | 9/2016 | Xie et al. |
| 9,887,985 B2 | 2/2018 | Xie et al. |
| 2005/0273399 A1* | 12/2005 | Soma ................. G06F 21/10 707/758 |
| 2011/0283108 A1* | 11/2011 | Miller ................. G06F 21/33 713/175 |
| 2012/0033811 A1* | 2/2012 | Hawkes .............. H04L 63/0428 380/255 |
| 2013/0061041 A1* | 3/2013 | Inoue ................. G06F 21/44 713/156 |
| 2015/0133117 A1* | 5/2015 | Lauer ................. H04W 76/10 455/435.1 |
| 2015/0273399 A1 | 10/2015 | Soma et al. |
| 2016/0173488 A1 | 6/2016 | Xie et al. |
| 2016/0373434 A1 | 12/2016 | Xie et al. |

OTHER PUBLICATIONS

Non-Final Rejection for U.S. Appl. No. 14/571,555 dated Jan. 20, 2016.
Notice of Allowance for U.S. Appl. No. 15/257,505 dated Oct. 18, 2017.
Non-Final Rejection for U.S. Appl. No. 15/257,505 dated Jun. 29, 2017.

* cited by examiner

MANAGEMENT OF CERTIFICATE AUTHORITY (CA) CERTIFICATES

CROSS-REFERENCE TO RELATED PATENTS

This application is a continuation of U.S. patent application Ser. No. 15/257,505, filed on Sep. 6, 2016, now U.S. Pat. No. 9,887,985, which is a continuation of U.S. patent application Ser. No. 14/571,555, filed on Dec. 16, 2014, now U.S. Pat. No. 9,455,980, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2018, Fortinet, Inc.

BACKGROUND

Field

Embodiments of the present invention generally relate to computer networking. In particular, various embodiments relate to management of a certificate authority (CA) certificate on a client machine and a network security appliance.

Description of the Related Art

Many networking applications require secure and authenticated communications. Secure Sockets Layer (SSL) and its related protocols are often used to enable secure communications between a client and a server. According to SSL protocols, session information between an SSL client and an SSL server are negotiated through a handshake phase and the identity of the SSL server is verified by the SSL client. The session information may include a session ID, peer certificates, the cipher specification to be used, the compression algorithm to be used, and shared secrets that are used to generate symmetric cryptographic keys. The SSL client encrypts a premaster secret with a public key from the SSL server's certificate and transmits the premaster secret to the server. Then, both parties compute the master secret locally and derive the session key from it. After the handshake phase, a secure socket is established, and application data encrypted by the session key can be securely transmitted between the client and server.

To inspect data that is encrypted in an SSL packet, a security policy enforcement device may perform SSL man-in-the-middle inspection as shown in FIG. 1. As shown in FIG. 1, a security policy enforcement device (e.g., firewall 120) comprises a kernel 121, a transparent SSL proxy 122 and an inspection module 123. When SSL client 110 initiates an SSL session with SSL server 130 through network 140, a client hello message is transmitted by SSL client 110 though an SSL port, such as port 443. A Transmission Control Protocol (TCP)/Internet Protocol (IP) stack within kernel 121 intercepts the client hello message by monitoring the SSL port. Next, the client hello message is redirected to transparent SSL proxy 122. Transparent SSL proxy 122 uses its own certificate to negotiate with SSL client 110 to setup a first SSL session ("SSL Session 1"). On the other hand, transparent SSL proxy 122 sends a client hello message to SSL server 130 and negotiates with SSL server 130 to setup a second SSL session ("SSL session 2") over network 150. After the two SSL sessions are established, transparent SSL proxy 122 possesses a session key used for encrypting and decrypting data in SSL session 1 and another session key used for encrypting and decrypting data in SSL session 2. When SSL client 110 transmits data to SSL server 130, data transmitted by SSL client 110 is actually encrypted by the session key negotiated with transparent SSL proxy 122, not SSL server 130. After an encrypted packet that is transmitted from SSL client 110 in SSL session 1 is intercepted by kernel 121, the packet is redirected to transparent SSL proxy 122. Because transparent SSL proxy 122 possesses the session key of SSL session 1, it can decrypt the encrypted packet sent by SSL client 110. After the packet is decrypted, plain data of the packet is sent to inspection module 123 by kernel 121. The plain data is scanned by inspection module 123 according to inspection policies. If the plain data passes the scan, the data is re-encrypted by transparent SSL proxy 122 using a session key that is negotiated between transparent SSL proxy 122 and SSL server 130. A re-encrypted packet is then transmitted by kernel 121 to SSL server 130 through SSL session 2.

During the handshake phase, SSL server 130 sends a server certificate that is issued by a certificate authority and signed by a CA certificate to SSL client 110. SSL client 110 checks trusted root certificates in the certificate store of SSL client 110 for the CA certificate that signed the server certificate. If the CA certificate is one of the trusted root certificates that are installed in the certificate store, it means that the server certificate is signed by a trusted CA and is acceptable to SSL client 110. If the CA certificate is not one of the trusted root certificates, SSL client 110 may present a warning message as shown in FIG. 2 to the user. The user is warned that the security certificate is not issued by a trusted certificate authority and is provided with options to continue or stop establishing the secure connection. If the user decides to continue the secure connection even though the CA is not trusted by SSL client 110, SSL client 110 may temporally accept this CA certificate. Generally, it is not a good practice for the user to accept un-trusted certificates when a warning message is presented.

In a man-in-the-middle SSL inspection system as shown in FIG. 1, transparent SSL proxy 122 establishes SSL session 1 with SSL client 110 and establishes SSL session 2 with SSL server 130 independently. The server certificate sent to SSL client 110 in session 1 is signed by CA certificate of firewall 120. SSL client 110 may show a warning message as shown in FIG. 2 if the CA certificate of firewall 120 is not installed in the certificate store as a trusted root certificate of SSL client 110. To avoid such a warning message, the CA certificate of firewall 120 may be installed manually on SSL client 110 so that the CA certificate of firewall 120 becomes a trusted root certificate of SSL client 110 and no warning message will be presented when encrypted data packets between SSL client 110 and SSL server 130 are inspected by firewall 120.

Manually installing a CA certificate within a firewall requires knowledge of certificates and different operating systems and platform may have different process for installing root CA certificates. It is not convenient for users to install the CA certificate on client systems. Therefore, there is a need for a method and system that automatically installs and manage CA certificates on client systems.

SUMMARY

Systems and methods are described for automatically installing CA certificates received from a network security appliance by a client security manager to make the CA certificate become a trusted CA certificate to a client machine. In one embodiment, a client security manager establishes a connection with a network security appliance through a network, wherein the client security manager is configured for managing security of a client at the client side and the network security appliance is configured for managing the security of traffic pass through the network. The client security manager downloads from the network security appliance a certificate authority (CA) certificate to be used for signing a server certificate of a secure connection between the network security appliance and the client and automatically installs the CA certificate into a certificate store of the client.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
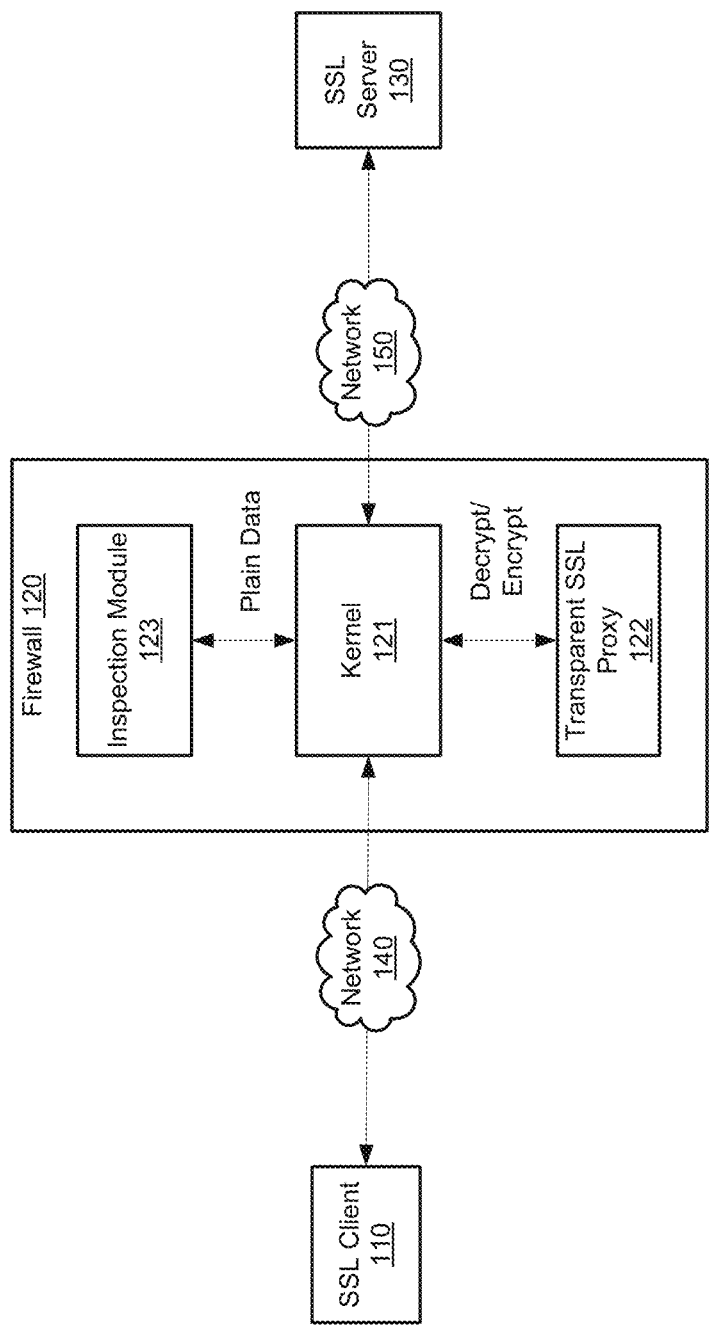
FIG. 1 conceptually illustrates a block diagram of a typical prior art SSL man-in-the-middle inspection system.
Figure 2:
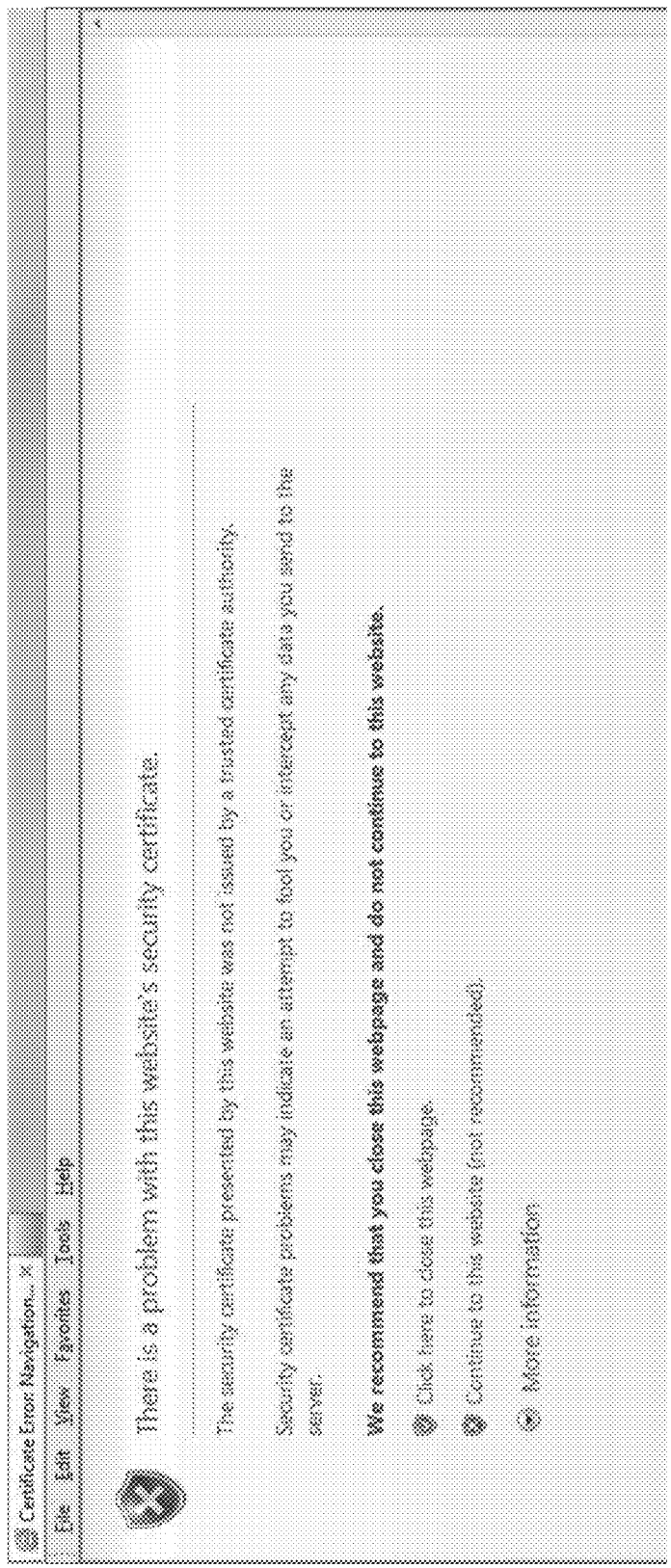
FIG. 2 illustrates a warning message shown by a client machine when a CA certificate is not trusted by the client system.

Systems and methods are described for automatically installing CA certificates received from a network security appliance by a client security manager to make the CA certificate become a trusted CA certificate to a client machine. According to one embodiment, a client security manager establishes a connection with a network security appliance through a network, wherein the client security manager is configured for managing security of a client at the client side and the network security appliance is configured for managing the security of traffic pass through the network. The client security manager downloads from the network security appliance a certificate authority (CA) certificate to be used for signing a server certificate of a secure connection between the network security appliance and the client and automatically installs the CA certificate into a certificate store of the client.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phrase "network security appliance" generally refers to a hardware device or appliance configured to be coupled to a network and to provide one or more of data privacy, protection, encryption and security. The network security appliance can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Figure 3:
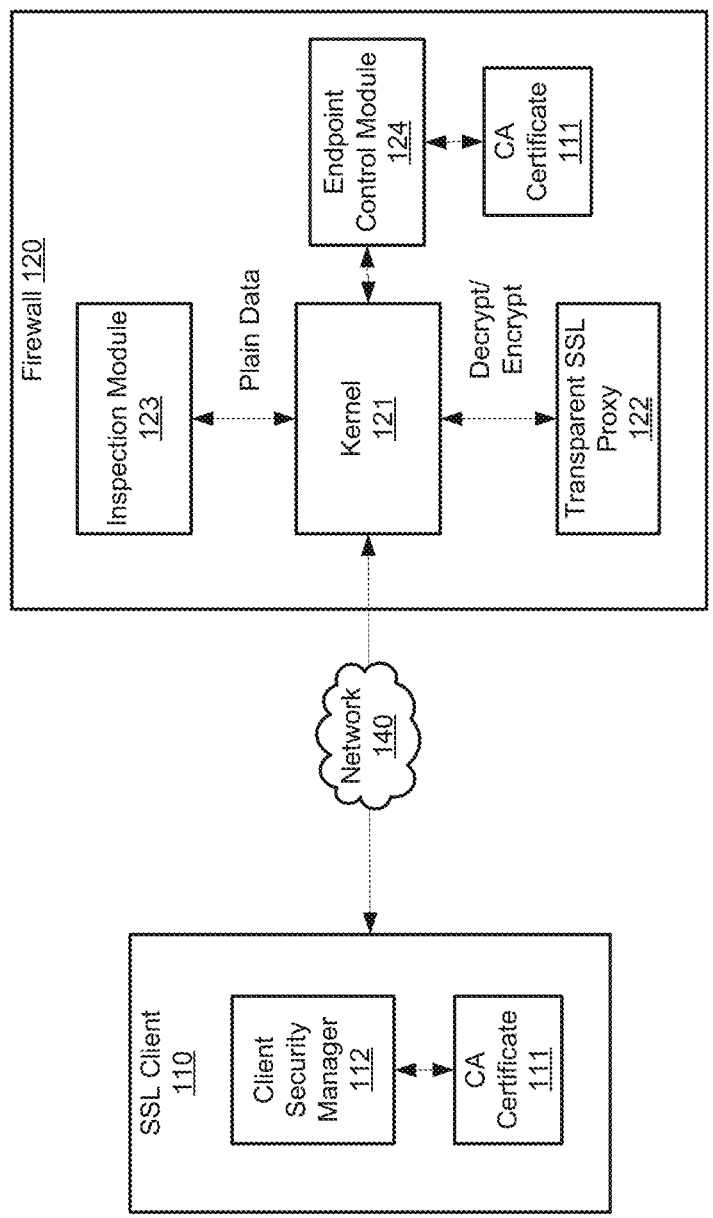
FIG. 3 illustrates exemplary process units of a client security manager and an inline inspection firewall in accordance with an embodiment of the present invention.

FIG. 3 illustrates exemplary process units of a client security manager and an inline inspection firewall 120 in accordance with an embodiment of the present invention. In the example of FIG. 3, all function units designated with the same reference number as in FIG. 1 have the same functionality as described in the example of FIG. 1. However, a client security manager 112 is configured to be installed and run on SSL client 110 and an endpoint control module 124 is configured to run on firewall 120.

Endpoint control module 124 may be a daemon running on firewall 120 that may manage the client security manager remotely. A CA certificate 111 may be generated by firewall 120 and used for signing a server certificate that is used for establishing an SSL session with SSL client 110 for deep inspection of encrypted traffic transmitted to and from SSL client 110. In some embodiments, CA certificate 111 may be a unique CA certificate to firewall 120 and may be generated when firewall 120 is powered up based on random parameters that are generated by a hardware random generator. In other embodiments, CA certificate 111 may be a CA certificate of the user of firewall 120 and it may be imported or uploaded by the user. CA certificate 111 may be pushed to SSL client 110 through a network connection between client security manager 112 and endpoint control module 124 and will be installed on SSL client 110 by client security manager 112. CA certificate 111 may be used for signing a server certificate that is used by transparent SSL proxy 122 to identify firewall 120 in an SSL session between SSL client 110 and firewall 120.

Client security manager 112 may be client-based software that offers a wide range of security features for client computers, including, but not limited to, personal computers, laptops or mobile devices. Client security manager 112 may provide multiple functions, including, but not limited to, virus scan, Virtual Private Network (VPN), two factor authentication, parental control and etc. Client security manager 112 may also connect to firewall 120 to extend the security function of firewall 120 to the client side. When client security manager 112 is installed or loaded on SSL client 110, client security manager 112 may send a registration or connecting request to firewall 120. Firewall 120 may send a client configuration file to client security manager 112 if the request is accepted. The client configuration file may include a CA certificate 111 issued by firewall 120. After client security manager 112 receives CA certificate 111, it is installed by client security manager 112 to the certificate store of SSL client 110. After CA certificate 111 is installed in the certificate store, CA certificate 111 become a trusted root CA certificate and the server certificate that is received by SSL client 110 in an SSL session and signed by CA certificate 111 will be trusted by SSL client 110 and no warning message will be presented to the user.

Figure 4A:
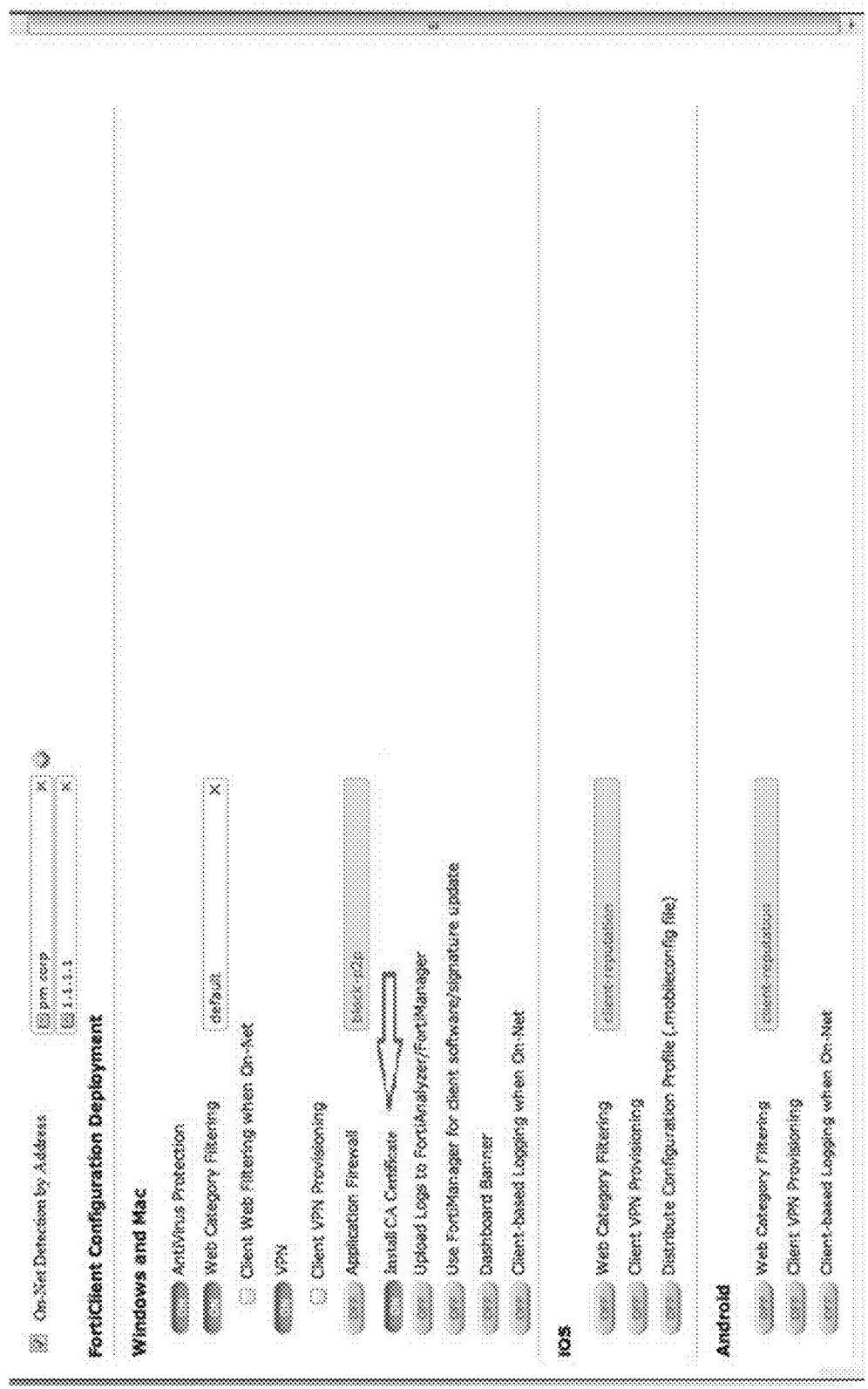
FIGS. 4A and 4B illustrate exemplary user interfaces of a network security appliances for configuration a CA certificate that will be pushed to client security manager in accordance with embodiments of the present invention.
Figure 4B:

FIGS. 4A and 4B illustrate exemplary user interfaces of network security appliances for configuration of a CA certificate that will be pushed to client security manager in accordance with embodiments of the present invention. In FIG. 4A, when a check box, as indicated by the arrow, is checked, the function of pushing a CA certificate to a client from the network security appliance is enabled and a CA certificate will be pushed to a client security manager after the client security manager is registered to the network security appliance. In FIG. 4B, a drop down list, as indicated by an arrow, provides multiple CA certificates that are stored or generated in the network security appliance. The administrator of the network security appliance may select one of them to be pushed to a client security manager after it is registered. A client configuration file including the selected CA certificate may be generated based on the selection made by the administrator at this configuration interface. The client configuration file may be pushed to client security managers that are registered or connected to the network security appliance so that the client security manager may be deployed and configured as required by the network administrator.

Figure 5:
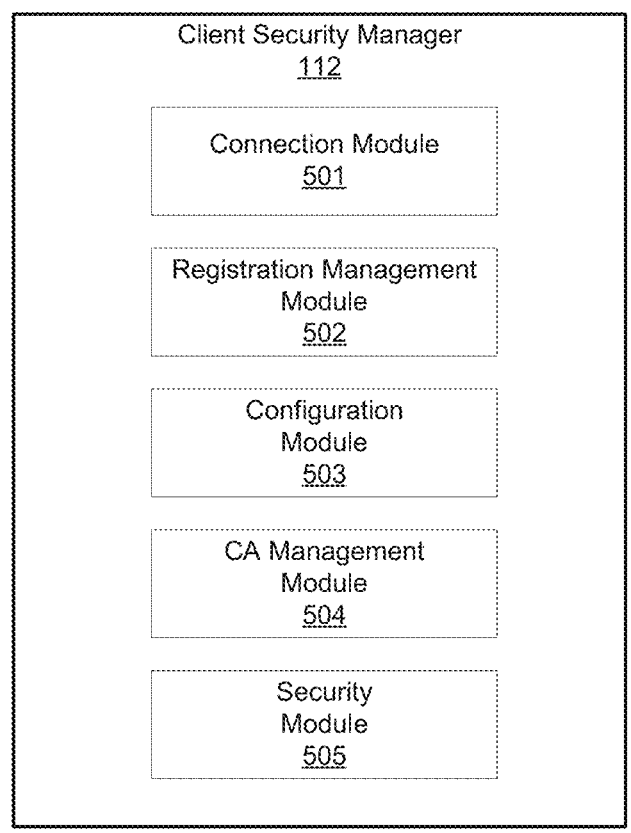
FIG. 5 illustrates exemplary process units of a client security manager in accordance with an embodiment of the present invention.

FIG. 5 illustrates exemplary process units of a client security manager 112 in accordance with an embodiment of the present invention. Client security manager may include a connection module 501, a registration management module 502, a configuration module 503, a CA management module 504 and a security module 505. Depending upon the particular implementation, client security manager 112 may be FORTICLIENT endpoint protection software (FORTICLIENT is a trademark or registered trademark of Fortinet, Inc. of Sunnyvale, Calif.). Client security manager 112 may be installed and run on various platforms, such as Windows, OS X, iOS and Android.

Connection module 501 is used for establishing a network connection with a network security appliance, e.g., a FORTIGATE network gateway (FORTIGATE is a trademark or registered trademark of Fortinet, Inc. of Sunnyvale, Calif.). When client security manager 112 is installed or loaded on a client machine, connection module 501 may try to find the network security appliance that is managing the network. Connection module 501 may initiate a request to establish a secure connection, for example, by way of SSL and/or IPsec, with the network security appliance based on an endpoint control protocol defined by the manufacturer of client security manager 112 and the network security appliance. By establishing a secure connection, data traffic between client security manager 112 and the network security appliance are encrypted and transmitted in the secure connection so that the transmitted data cannot be intercepted by a third party.

Registration management module 502 is used for registering or un-registering client security manager 112 with the network security appliance. Generally, when client security manager 112 is installed on a client machine, registration management module 502 may send a registration request and registration information, such as registration serial number, to the network security appliance through the secure tunnel between client security manager 112 and the network security appliance. When the user of client security manager 112 wants to un-register it from the network security appliance, registration management module 502 may send a un-registration request to the network security appliance.

Configuration module 503 is used for receiving a client configuration file from the network security appliance and configuring client security manager 112 according to the client configuration file. Generally, after client security manager 112 is registered with a client security manager, the client security manager may push a client configuration file to client security manager 112 through the secure tunnel established between client security manager 112 and the network security appliance. The client configuration file may be an extensible markup language (XML) file including multiple elements defining the settings that should be used on client security manager 112. After the client configuration file is received, configuration module 503 may extract each element of the client configuration file and configure settings and functions of client security manager 112 accordingly. If a CA certificate is included in the client configuration file, the CA certificate is extracted from the client configuration file and sent to CA management module 504 for installation within a CA certificate store of the client machine. Configuration module 503 may also backup the settings of client security manager 112 as well as the CA certificate downloaded from the network security appliance to a backup file that is locally stored on the client machine. The backup file may be used for restoring previous settings and the CA certificate when client security manager is restored on the client machine.

CA management module 504 is used for managing CA certificates received from the network security appliance. When a CA certificate is received from the network security appliance with which client security manager 112 is registered, CA management module 504 may optionally check if the CA certificate is a valid certificate, e.g., not expired and etc. After the verification, CA management module 504 may call corresponding certificate Application Programming Interfaces (APIs) or tools to install the CA certificate into a certificate store of the client machine. Further, when client security manager 112 is un-registered from the network security appliance or uninstalled from the client machine, CA management module 504 may optionally call corresponding APIs or tools to delete the CA certificate from the certificate store to avoid too many CA certificates from remaining in the certificate store.

Security module 505 may include multiple modules that provide security functions of client security manager 112, including, but not limited to, virus scan, web filtering, VPN connection, parental control and etc. These functions are well-known to persons skilled in the art and detailed descriptions thereof will be omitted for sake of brevity.

Figure 6:
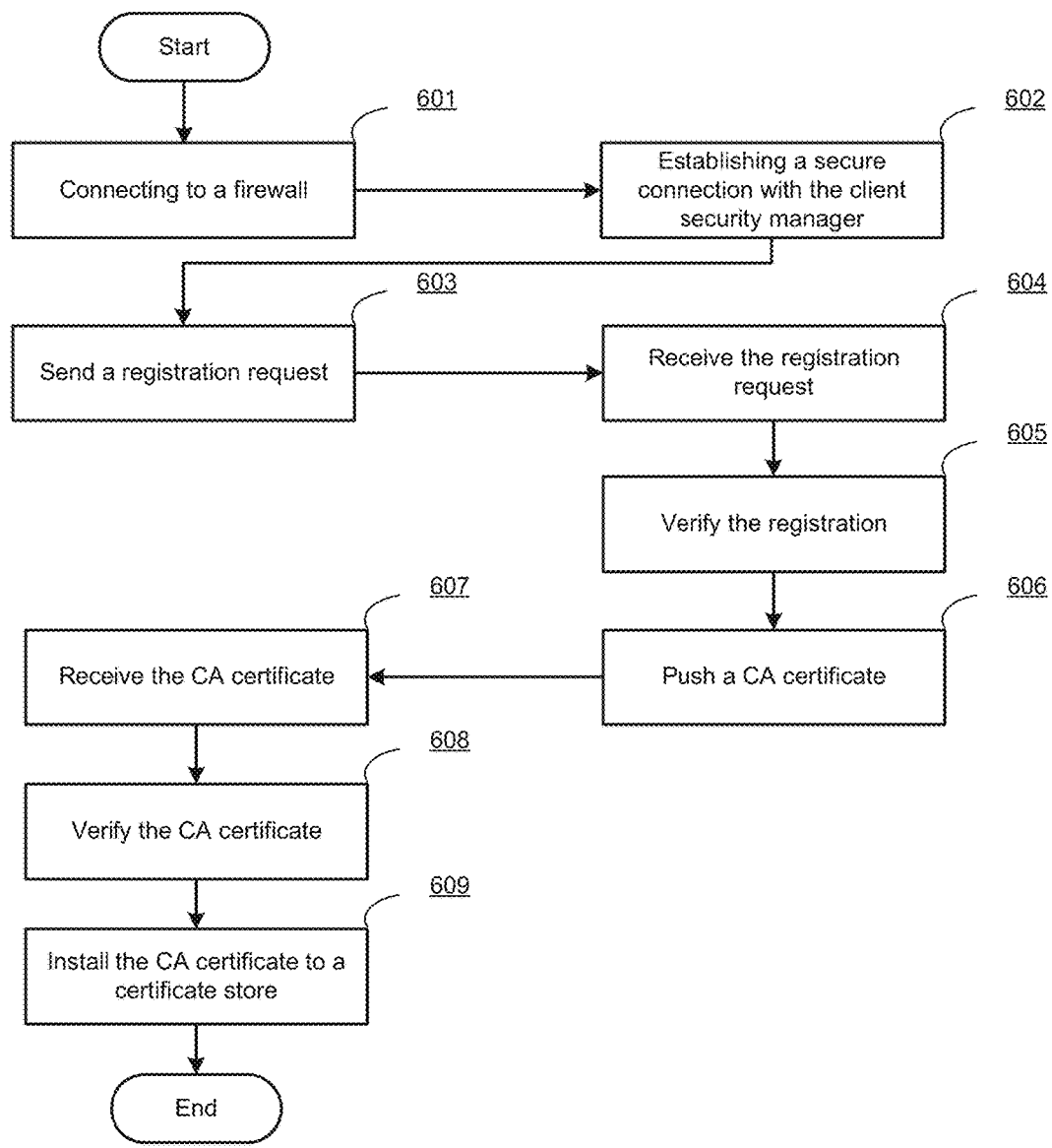
FIG. 6 illustrates a flow diagram for automatically installing a CA certificate by a client security manager in accordance with an embodiment of the present invention.

FIG. 6 illustrates a flow diagram for automatically installing a CA certificate by a client security manager in accordance with an embodiment of the present invention. In the example of FIG. 6, the steps on the left side of the figure are carried out on a client (e.g., by a client security manager) and the steps on the right side of the figure are carried out by a network security device (e.g., a firewall).

At block 601, a client security manager initiates a connection to a firewall when the client security manager is installed or loaded on the client machine. In some examples, the client security manager may initiate a secure connection to the firewall based on an endpoint control protocol that is defined by the manufacture of the client security manager and the firewall. The endpoint control protocol may control the data and control message transmission between the client security manager and the firewall across a network in a secure way. The endpoint control protocol may be a private protocol or a standard control protocol, e.g., Control And Provisioning of Wireless Access Points (CAPWAP).

At block 602, the firewall negotiates with the client security manager and establishes a secure connection between the client security manager and the firewall. After the secure connection is established, data and control messages between the client security manager and the firewall may be transmitted through the network without being intercepted by third parties.

At block 603, the client security manager may send a register request to the firewall if it is the first time that the client security manager is installed on the client machine. The registration request may include registration information, such as serial numbers, user information and etc., which are used for verifying a legitimate user of the client security manager and the firewall. If the client security manager is already registered with the firewall, the client security manager may send a login request at each time that it is loaded for running on the client machine.

At block 604, the firewall receives the registration request or the login request and verifies if the client security manager is a legitimate user based on the received registration information or user credentials at block 605. If the client security manager is not a legitimate user, the request is rejected. If the client security manager is a legitimate user, the process goes to block 606

At block 606, a CA certificate is pushed to the client security manager through the secure connection. In some examples, the firewall may push a client configuration file to the client security manager when the client security manager is registered with the firewall based on the endpoint control protocol. The client configuration file may be an extensible markup language (XML) file that includes settings to be used by the client security manager for configuring various functions to be executed on the client machine. The CA certificate of the firewall may be an element of the client configuration file. Further, the CA certificate may be a unique CA certificate to the firewall. In other examples, the user of firewall may also import or upload his own CA certificate to the firewall and use the custom certificate to sign the server certificate during the SSL session with the SSL client.

At block 607, the client configuration file is received by the client security manager and the CA certificate may be extracted from the client configuration file.

At block 608, the client security manager may verify if the CA certificate is a valid CA certificate based on the digital signature included in the CA certificate.

At block 609, if the CA certificate is verified as a legitimate one, the client security manager may install the CA certificate to the certificate store of the client machine. As different platforms may have different mechanisms for managing certificate, client security manager may call a corresponding API to perform the installation. For Microsoft Windows (trademarks of Microsoft Corp.) platforms, the client security manager may use the Windows Crypto API to add the CA certificates to the Windows certificate store. The CA certificate may be stored as trusted root certificates of the Windows certificate store. For Android™ platforms, the client security manager may use the Android build-in KeyChain API to add the certificates as trusted CA certificates. For OS X (trademarks of Apple Inc.) platforms, the client security manager may use the OSX "Certificate, Key, and Trust Services" API to add the certificates to the Keychain store. For iOS (trademarks of Apple Inc.) platform, the client security manager may use the iOS "Certificate, Key, and Trust Services" API to add the certificates to the Keychain store. After the CA certificate is installed on the system certificate store, web browsers that use the system certificates store will not present a warning message when a server certificate that is signed by the CA certificate downloaded from the firewall is received during an SSL session. Web browsers that use system certificate store include Google Chrome, Internet Explorer and etc. As the Firefox web browser manages the certificates by itself, FireFox tool "certutil.exe" can be used by the client security manager to add a CA certificate to the Firefox certificate database so that the CA certificate issued by the firewall become a trusted one for the Firefox web browser. When the API associated with installing the CA certificate is called by the client security manager and the CA certificate is installed into the system certificate store, a warning message may be presented by the client system informing the user that a new CA certificate is about to be installed. The user may allow the CA certificate that is downloaded by the client security manager to be installed by clicking a confirmation button and the CA certificate will be installed into the CA certificate store by the client system.

After the CA certificate of the firewall is installed on the client machine, the client security manager may provide additional management functionality in relation to the CA certificate. For example, the CA certificate together with other configurations of the client security manager may be exported to a local storage for backup purpose so that the settings and CA certificate may be restored when the client security manager is re-installed.

Further, when the client security manager is uninstalled from the client machine, the CA certificate may optionally be deleted from the certificate store of the client machine. When the client security manager is un-registered from the firewall, the client security manager may send a un-register request to the firewall. The CA certificate may optionally be deleted from the certificate store of the client machine. By deleting CA certificate downloaded from the firewall when the client security manager is un-registered with the firewall or uninstalled from the client machine, the certificate storage of the client machine will not keep too many unnecessary certificates.

Further, each CA certificate issued by a certificate authority has a validity period based on the certificate management protocol. The firewall may generate a new CA certificate or renew the CA certificate before it is expired. If a new CA certificate is generated or the CA certificate is renewed, the endpoint control module of the firewall may push the new CA certificate to the client security manager when the client security manager is connected to the firewall. The client security manager may delete the old CA certificate from the client machine and install the new CA certificate to the trusted certificate store of the client machine.

Figure 7:
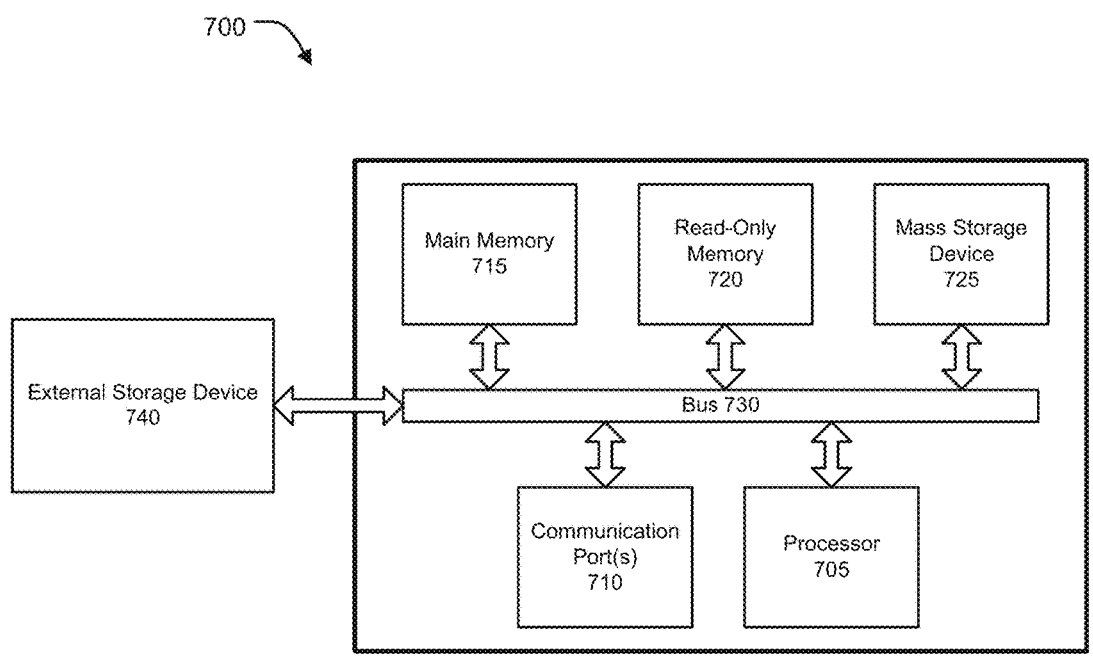
FIG. 7 illustrates an exemplary computer system in which or with which embodiments of the present invention may be utilized.

FIG. 7 is an example of a computer system 700 with which embodiments of the present disclosure may be utilized. Computer system 700 may represent or form a part of a network security appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method of facilitating inline inspection of Secure Sockets Layer (SSL) traffic exchanged between an SSL client and an SSL server by a network security device, the method comprising:
   establishing, by endpoint protection software running on a client computer system associated with a private network, a connection with an endpoint control module of the network security device via the private network, wherein the endpoint protection software manages security of the client computer system;
   receiving via the connection, by the endpoint protection software, from the network security device a certificate authority (CA) certificate by which a server certificate is to be signed, wherein the server certificate is used to establish an SSL session between a transparent SSL proxy running within the network security device and the client computer system;
   causing the client computer system to trust the server certificate when the server certificate is subsequently received from the network security device during establishment of the SSL session by installing, by the endpoint protection software, the CA certificate into a certificate store of the client computer system.

2. The method of claim 1, further comprising:
   sending, by the endpoint protection software, a registration request and registration information to the network security device; and
   wherein said receiving is performed after registration is accepted by the network security device.

3. The method of claim 1, further comprising verifying, by the endpoint protection software, the CA certificate before installing the CA certificate within the certificate store by evaluating a digital signature included in the CA certificate.

4. The method of claim 1, wherein the CA certificate is unique to the network security device.

5. The method of claim 1, further comprising exporting, by the endpoint protection software, the CA certificate to local storage of the client computer system.

6. The method of claim 1, wherein said installing, by the endpoint protection software, the CA certificate within a certificate store of the client computer system comprises calling, by the endpoint protection software, a corresponding application programming interface (API) or a tool of the client computer system for installing the CA certificate within the certificate store.

7. The method of claim 1, wherein the CA certificate is installed within the certificate store as a trusted root CA certificate.

8. The method of claim 1, wherein the network security device comprises a firewall.

9. The method of claim 1, wherein the network security device comprises a Unified Threat Management (UTM) appliance.

10. A computer system comprising:
    non-transitory storage device having embodied therein instructions representing an endpoint protection application; and
    one or more processors coupled to the non-transitory storage device and operable to execute the endpoint protection application to perform a method of facilitating inline inspection of Secure Sockets Layer (SSL) traffic exchanged via a private network between an SSL client and an SSL server by a network security device, the method comprising:
    establishing a connection with an endpoint control module of the network security device via the private network, wherein the endpoint protection software manages security of the client computer system;
    receiving via the connection from the network security device a certificate authority (CA) certificate by which a server certificate is to be signed, wherein the server certificate is used to establish an SSL session between a transparent SSL proxy running within the network security device and the computer system;
    causing the computer system to trust the server certificate when the server certificate is subsequently received from the network security device during establishment of the SSL session by installing the CA certificate into a certificate store of the computer system.

11. The computer system of claim 10, wherein the method further comprises:
    sending a registration request and registration information to the network security device; and
    wherein said receiving is performed after registration is accepted by the network security device.

12. The computer system of claim 10, wherein the method further comprises verifying the CA certificate before installing the CA certificate within the certificate store by evaluating a digital signature included in the CA certificate.

13. The computer system of claim 10, wherein the CA certificate is unique to the network security device.

14. The computer system of claim 10, wherein the method further comprises exporting the CA certificate to local storage of the computer system.

15. The computer system of claim 10, wherein said installing the CA certificate within a certificate store of the computer system comprises calling a corresponding application programming interface (API) of an operating system of the computer system or a tool of the computer system for installing the CA certificate within the certificate store.

16. The computer system of claim 10, wherein the CA certificate is installed within the certificate store as a trusted root CA certificate.

17. The computer system of claim 10, wherein the network security device comprises a firewall.

18. The computer system of claim 10, wherein the network security device comprises a Unified Threat Management (UTM) appliance.

\* \* \* \* \*